Oct. 21, 1958  J. J. GRIFFITTS  2,856,932
BAG AND TUBE
Filed Dec. 16, 1955  2 Sheets-Sheet 1
FIG.1. FIG.2. FIG.3.
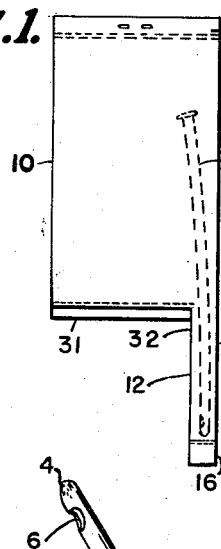
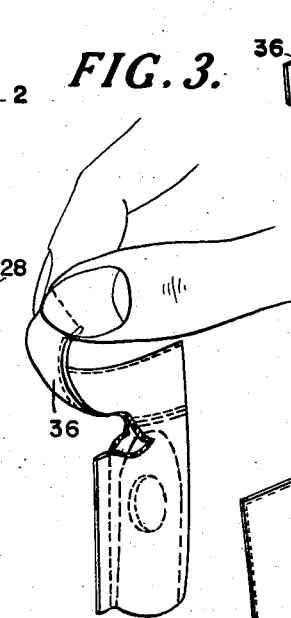
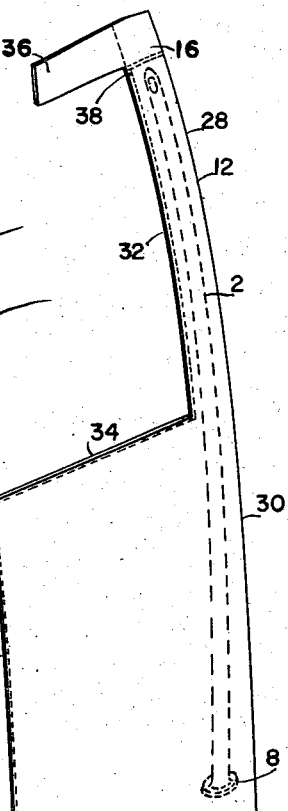
FIG.4.
FIG.5.
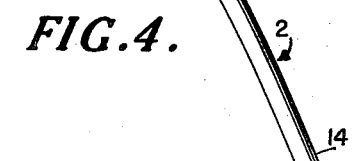
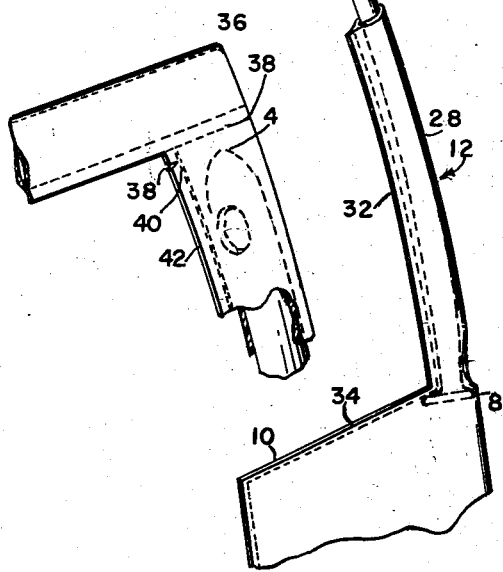
INVENTOR
JAMES J. GRIFFITTS
BY
Cushman, Darby & Cushman
ATTORNEYS Oct. 21, 1958  J. J. GRIFFITTS  2,856,932
BAG AND TUBE
Filed Dec. 16, 1955  2 Sheets-Sheet 2
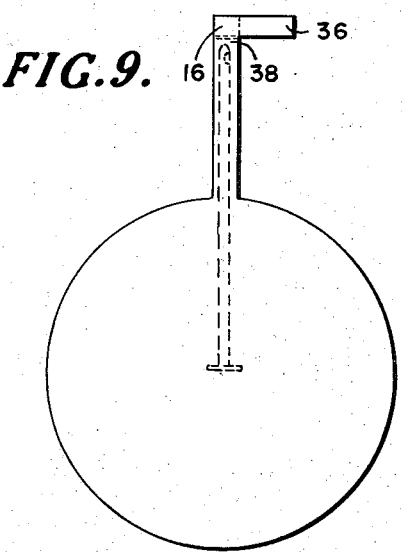
FIG.9.
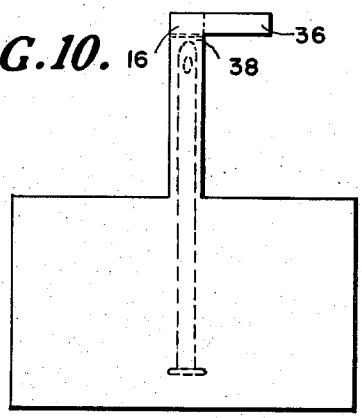
FIG.10.
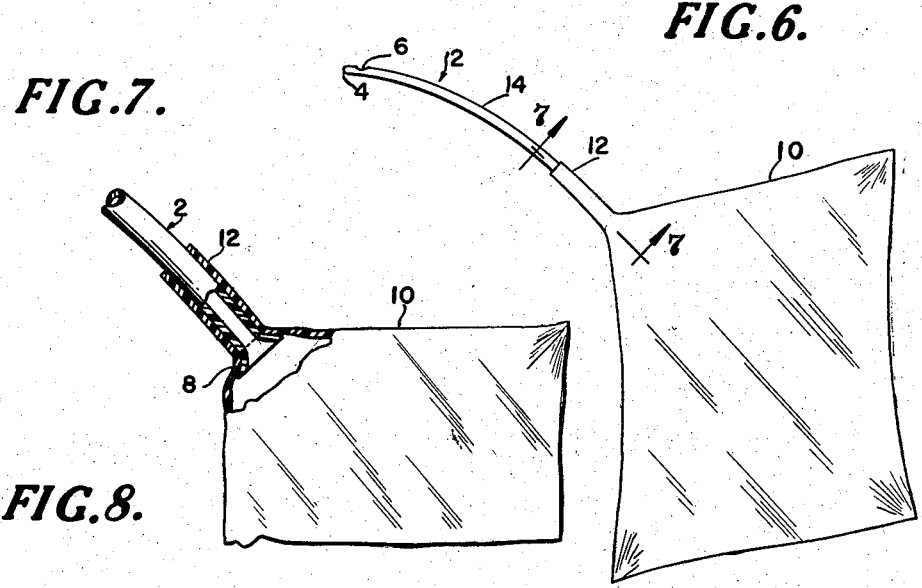
FIG.6.
FIG.7.
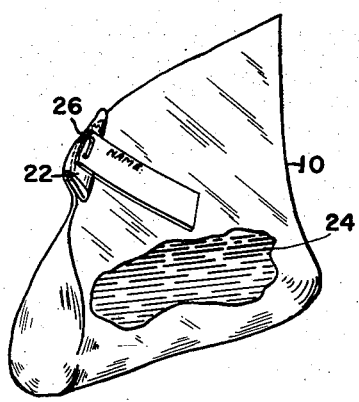
FIG.8.
INVENTOR
JAMES J. GRIFFITTS
BY Cushman, Darby & Cushman
ATTORNEYS United States Patent Office 2,856,932
Patented Oct. 21, 1958

2,856,932

BAG AND TUBE

James J. Griffitts, Miami, Fla., assignor to Dade Reagents, Inc., Miami, Fla., a corporation of Florida Application December 16, 1955, Serial No. 553,554

12 Claims. (Cl. 128—294)

The present invention relates to a urethral catheter, a means for maintaining it sterile until use and a means of collecting urine from female patients under more convenient and cleaner circumstances than has previously been possible.

It is an object of this invention to maintain a catheter sterile before use and to collect urine under sterile conditions using this catheter.

It is an additional object to devise an improved catheter.

Another object is to provide a novel combination of a catheter and a urine collection bag.

A further object is to collect urine from female patients under easier and more sterile conditions, obviating, for example, the use of sterile gloved hands in the collection of urine for bacterial culture.

The accomplishment of these and other objects of the invention will become evident as the description of the invention proceeds.

According to the invention there is provided a flexible plastic container which houses a slightly stiffer plastic catheter tube; the entire unit is closed and sterilized, e. g., by gas, or by ultra violet light or high voltage irradiation, or by heat. When the catheter is to be used, a tip is cut or torn from the flexible container and the catheter is pushed out without touching the same, and while still grasping the flexible container to maintain the catheter sterile, the catheter is inserted into the urethra and urine is collected directly in the bag which is still held to the catheter by a flare on the end of the catheter. Since the bag is collapsed to start with, there is no problem of expelling air in the course of collection. When the desired amount of urine is in the bag, the catheter is removed from the bag. The catheter may be left in the bladder until it is drained if this is desired. The neck through which the catheter has been brought out can then be folded and held in this condition, for example, by a paper clip, or staple, or may be closed by any closing device, such as a slit in an attached identity card. The bag then holds sterile urine which can be used for culture purposes or for microscopic and chemical examination. A printed label can be applied to the side of the plastic container, for example, before sterilization in the form of silk screening or a permanently affixed tag on which can be written the patient's name, doctor's name, laboratory number, studies to be made, etc., can be attached.

The entire unit, which is made of light weight materials, serves as a one-use disposable device.

Basically, a sterile catheter is packaged in a flexible, enlarged container from which it is fed under sterile conditions in order to accomplish a sterile catheterization, and the sterile container simultaneously acts as a holder for the urine collected through the catheter from the bladder.

As is customary in this art, the outside diameter of the catheter may vary from approximately 0.1 inch to 0.5 inch or more. These dimensions are known to those practiced in medicine as "French Nos. 1 to 40." The external surface should be smooth, continuous and non-porous, and the catheter should be flexible but it should have sufficient tensile strength and longitudinal rigidity to permit insertion by itself into and through tortuous bodily passages without collapsing. The catheter near its forward end has at least one, and frequently two, openings or eyes and the forward tip is closed and smoothly rounded, e. g., to form an "olive" tip or a "whistle" tip to facilitate insertion.

Various plastics have been proposed in the past as being suitable for making catheters and these can be employed in making the catheter used in the present invention. Thus, the catheter can be a synthetic linear superpolyamide, e. g., polymeric epsilon caprolactam, polymeric hexamethylene adipamide or sebacamide as well as other forms of nylon such as are described in United States Patents 2,071,250 and 2,130,948. Also, it can be made of a polyester, e. g., polyethylene terephthalate and other polymeric esters as disclosed in Patent 2,465,319. Similarly, it can be made of a vinylidene resin, e. g., a copolymer of vinylidene chloride with a minor amount (e. g. 15%) of vinyl chloride or acrylonitrile or it can be made of a vinyl resin, e. g., a copolymer of 80% vinyl chloride with 20% of vinyl acetate. The vinyl resin can be plasticized in conventional fashion, e. g., with dibutyl cellosolve phthalate or dibutyl phthalate. Similarly, the catheter can be made of cellulose derivatives including cellulose esters such as cellulose acetate butyrate and cellulose acetate or acrylates such as methyl methacrylate can be used.

Preferably, however, the catheter is made of polyethylene, a material not previously recognized as being suitable for making a catheter. It has further been found that polyethylene has an optimum of those qualities necessary to make a good catheter.

When polyethylene is used as the catheter, it has been found that with an external diameter of about 0.157 inch, or French size No. 12, the internal diameter can be as much as about 0.125 inch, which is about equivalent to the hole in a number 16 French rubber catheter. Other sizes may be used where they are suited. Moreover, with polyethylene there is no need to use plasticizers, stabilizing agents, vulcanizing agents, fillers, and other extraneous and often irritating materials necessary with vinyl esters, rubber and certain other plastics.

The plastic bag is preferably even more flexible than the catheter and can be made of the same or different plastic than the catheter, but usually is not as thick. This aids in maintaining flexibility. Specifically, the flexible bag can be made of polyethylene, vinylidene chloride resin-coated polyethylene, vinyl chloride-vinyl acetate copolymer, natural rubber, rubbery butadiene-styrene copolymer, nylon (e. g., polymeric hexamethylene adipamide) etc. In comparison to the catheter, the bag is greatly enlarged, having a surface area more than ten times that of the catheter.

Referring to the drawings:

Figure 1 is a vertical elevation in inverted position of a preferred form of the invention wherein the sterilized catheter is inside the flexible bag and the tube-like extension of the bag is a continuation of one adjacent side of the bag and at a right angle to the other adjacent side;

Figure 2 is a view similar to Figure 1 showing the bag in upright position and illustrating a bag having improved opening facilities;

Figure 3 is a perspective view, partially in section, illustrating the manner of opening the bag in Figure 2;

Figure 4 is a vertical elevation of the bag in Figure 2 showing the catheter in extended position with the rearward end still retained in the bag;

Figure 5 is a fragmentary view, partially broken away in section, showing the flag end of the bag in Figure 2;

Figure 6 is a perspective view similar to Figure 4 showing an alternative form of the invention wherein the tube-like extension of the bag is at an angle to both adjacent sides of the bag rather than a continuation of one side of the bag and at a right angle to the other side;

Figure 7 is a fragmentary section on the line 7—7 of Figure 6;

Figure 8 is a perspective view, partially broken away, of the closed bag after removal of the catheter;

Figure 9 shows another modification of the bag wherein the bag is circular in cross section, and Figure 10 shows still another modification wherein the bag is rectangular in cross section and the tube-like extension is substantially centrally disposed on one side of the rectangle.

Catheter 2 is made of polyethylene and, as previously set forth, has a smooth exterior. Near closed elliptical forward end 4 is an eye or opening 6 as is conventional in a catheter of this type. The catheter 2 has a substantially cylindrical body 14 from its elliptical forward end 4 to its rearward end 8. The rearward end is flared outwardly as shown in Figures 4 and 7, to insure that it will not easily leave the container (bag) and also for the reason that its rearward end will make a tight fit with the tips of commonly available glass syringes. This allows injections of medicinal substances into the bladder or aspiration of fluid from the bladder. The catheter is enclosed in flexible bag 10, also made, for example, from polyethylene, and the bag is in collapsed condition. The bag 10 preferably is of generally rectangular shape but on one end thereof there is a relatively narrow and elongated neck 12 through which the catheter can be pushed by appropriate manipulation of the bag without touching the catheter, thus keeping the latter sterile. The diameter of the neck 12 is substantially the same as the external diameter of the body 14 so that there is a relatively tight fit. The diameter of the neck 12, however, is slightly less than the external diameter of the flared end 8 of the catheter. The polyethylene bag can be made of conventional flat tubing, the catheter inserted and the tubing sealed in conventional fashion. Alternatively, the catheter can be placed between two sheets of polyethylene film cut in the desired pattern. The two sheets are then sealed together in conventional fashion. The bag 10 with the catheter 2 inside is then sterilized, e. g., by adequate exposure to bactericidal gas vapors, or by other suitable means.

In the modification shown in Figures 1, 2 and 4 and considering the collapsed bag to be in a single plane, the relatively narrow tube-like portion 12 is formed by an extension 28 of side 30 of the bag 10 and by a substantially parallel side 32 which is perpendicular to the side 34 of the bag.

While it is possible to open the bag to remove the catheter for use simply by cutting off end 16 of the neck 12, it has been found preferable to employ an opening mechanism such as that illustrated in Figures 2, 3, 5, 9 and 10. As shown in these figures, the end 16 of neck 12 is covered by a flag or tab 36 of greater width than the end of the neck so that the flag can be readily grasped. The flag can be made of the same or different material than the bag, but preferably, like the bag, is made of polyethylene. To insure that the flag will not prematurely fall off the end of the neck, the tab can be heat welded at 38 to the neck 12 near the end thereof as is best shown in Figure 5. For ease of manufacture the flag 36 is usually made separately from the bag 10 but it is also possible to make the bag and tab of unitary structure with the tab being a vertical extension on the end of the neck.

Near the tip of the neck 12 there is a nick, cut or other perforation 38 so that when the flag 36 is pulled, as shown in Figure 3, the end of the neck is torn off and the bag is open, ready for use. Desirably, the nick 38 does not extend the full width of seal 40 on wall 42 of the neck so that there is complete assurance that sterility of the contents of the bag is maintained until use.

While it is possible to package the catheter in any manner in the bag and then subsequently at the time of use force the tip 4 into the neck 12, it has been found preferable to package the catheter in the manner illustrated in the drawings, namely, with the tip 4 already guided through the narrow neck portion 12 of the bag. It is much easier to use the catheter in such case. Additionally, including the distal portion of the catheter in the neck of the bag permits the operator to direct the catheter in the desired direction toward the target while still contained in a sterile surrounding much better than if it were simply extruded from a bag which did not have the narrow elongated construction. It is desirable, as shown in the drawings, to use a combination of bag and catheter wherein the distance from the juncture of the neck portion with the remainder of the bag to any wall of the bag is less than the length of the catheter.

Upon opening of the end 16 in the aforementioned manner, the end 4 of the catheter is forced therethrough and inserted into the urethra of a patient. The flared rearward end 8 of the catheter, being larger than the neck 12, is wedged against the sides 18 and 20 of the bag and thus the catheter remains connected with the bag during use and the urine 24 is collected under sterile conditions. The bag 10 can hang free in convenient manner during collection of urine due to its attachment to the catheter. When sufficient sample of urine is in the bag, the catheter is removed from the bag by grasping the catheter external of the bag and the bag is then pulled off the catheter by holding the distal end of the catheter to allow it to remain in the bladder. The catheter is sufficiently flexible to direct the flow of the remainder of urine in the bladder into a suitable receptable. This is possible due to the flexible and expandable nature of the material of which the bag is made. The neck 12 is then folded in the manner indicated at 22 and clipped, or closed by compression and tagged at 26 or the bag can be tagged at 44 before use. Alternatively, the end 16 of the neck can be heat sealed.

The enlarged flexible collection bag, which also serves as a container for the catheter prior to use, is of integral construction in contrast to certain prior art relatively narrow and separable catheter cases. The latter are not readily adaptable to serve the dual function served by the bag 10 of the present invention.

While the relatively flat bag 10 is preferably rectangular in cross section, it also can be elliptical or circular (Figure 9) or can have almost any rectilinear form so long as it has a neck of the type described. Thus, an octagon-shaped bag or a round bag with a neck on it also can be satisfactorily and conveniently used in some instances.

Similarly, while it is preferred to have the neck of the bag positioned as in Figures 1, 2 and 4, it is also possible to have this tube-like extension positioned centrally as shown in Figure 10 or at an angle to the edges of the bag as shown in Figures 6 and 7.

I claim:

1. A sterile combination of a flexible plastic catheter tube enclosed in a much larger, flexible, collapsible, integral urine collection bag, said bag having a relatively narrow and elongated neck portion adapted to serve as a passageway for said catheter, said catheter being longer than said bag exclusive of said neck and the tip of said catheter being in said neck.

2. A sterile combination as recited in claim 1 wherein one end of the catheter is of enlarged external diameter and is adapted to hold the catheter in the narrow, elongated neck portion of the plastic bag when in use.

3. A combination of a polyethylene catheter comprising a relatively long, cylindrical, flexible tube having a closed end, an outwardly flared open end and an eye adjacent the closed end enclosed in a much larger, flexible, collapsible, generally rectilinear integral urine collection bag, said bag having a relatively narrow and elongated neck portion at one corner thereof adapted to serve as a passageway for said catheter and said catheter being wedged in said one corner by said outwardly flared open end.

4. A sterile combination of a flexible plastic catheter tube enclosed in a much larger, flexible, collapsible, rounded integral urine collection bag, said bag having a relatively narrow and elongated neck portion adapted to serve as a passageway for said catheter.

5. A combination of a catheter made of polyethylene enclosed in a much larger, flexible, collapsible, rounded integral urine collection bag, said bag having a relatively narrow and elongated neck portion adapted to serve as a passageway for said catheter and said catheter having an outwardly flared open end and being wedged in said neck by said outwardly flared open end.

6. A sterile combination of a flexible plastic catheter tube enclosed in a much larger, flexible, collapsible, integral urine collection bag, said bag having a relatively narrow and elongated neck portion adapted to serve as a passageway for said catheter and a tab at the outer end of said neck portion adapted to assist in the opening of said bag.

7. A combination as in claim 6 wherein there is a perforation in one side of the neck of the bag near the outer end thereof but below said tab to aid in opening the bag.

8. A combination as in claim 7 wherein the bag is generally rectilinear in shape.

9. A combination as in claim 8 wherein the bag is generally rectangular in shape and the neck portion is at one corner thereof.

10. A sterile combination of a flexible plastic catheter tube enclosed in a much larger, flexible, collapsible, closed integral urine collection bag, said bag having a relatively narrow and elongated neck portion adapted to serve as a passageway for said catheter, the tip and distal portion of said catheter being disposed in said neck in position to be ejected therefrom upon opening of the end of said neck portion.

11. A sterile combination according to claim 10 wherein said neck portion has a tab adjacent the outer end thereof and a perforation in one side thereof near the outer end but below said tab.

12. A sterile combination according to claim 10 wherein the distance from the juncture of the neck portion with the remainder of the bag to any wall of the bag is less than the length of the catheter.

References Cited in the file of this patent

UNITED STATES PATENTS

| | | |
|---|---|---|
| 1,696,763 | Hare | Dec. 25, 1928 |
| 2,099,425 | Goodman | Nov. 16, 1937 |
| 2,612,895 | Magee | Oct. 7, 1952 |
| 2,664,891 | Kempel | Jan. 5, 1954 |
| 2,664,893 | Kempel | Jan. 5, 1954 |
| 2,667,875 | Wallace | Feb. 2, 1954 |

FOREIGN PATENTS

| | | |
|---|---|---|
| 694,761 | France | Sept. 22, 1930 |
| 642,256 | Great Britain | Aug. 30, 1950 |
| 911,112 | Germany | May 10, 1954 |